United States Patent [19]

Farrand et al.

[11] 4,227,165

[45] Oct. 7, 1980

[54] CORRECTION OF LINEAR ERRORS IN POSITION MEASURING TRANSDUCERS

[75] Inventors: Clair L. Farrand, Bronxville; William H. Clifford, Yonkers, both of N.Y.

[73] Assignee: Farrand Industies, Inc., Valhalla, N.Y.

[21] Appl. No.: 5,116

[22] Filed: Jan. 22, 1979

[51] Int. Cl.³ ............................................. H01F 21/04
[52] U.S. Cl. ...................................... 336/20; 336/129
[58] Field of Search ................ 336/20, 129, 123, 121, 336/115, 120; 73/1 B; 361/287; 338/2, 4, 6, 5, 3, 99, 114, 104, 106, 113

[56] References Cited

U.S. PATENT DOCUMENTS

| | | | |
|---|---|---|---|
| 2,927,458 | 3/1960 | Moon, Jr. et al. | 338/5 X |
| 2,942,212 | 6/1960 | Mynall | 336/129 X |
| 2,998,585 | 8/1961 | Bodner et al. | 338/5 |
| 3,297,971 | 1/1967 | Gindes | 338/5 |
| 3,853,000 | 10/1974 | Barnett et al. | 338/6 X |

FOREIGN PATENT DOCUMENTS

| | | | |
|---|---|---|---|
| 655243 | 1/1963 | Canada | 338/2 |
| 949844 | 2/1964 | United Kingdom | 338/6 |

*Primary Examiner*—Thomas J. Kozma
*Attorney, Agent, or Firm*—John L. Downing

[57] ABSTRACT

A member of a linear position measuring transducer is provided with a hole running parallel to its windings. In one embodiment, elements are inserted into the hole to expand or shorten the length of the transducer. In another embodiment, cutout slots are made between quadrature sections of windings and the elements are introduced into the hole to alter the relative spacing between these quadrature winding sections.

1 Claim, 10 Drawing Figures

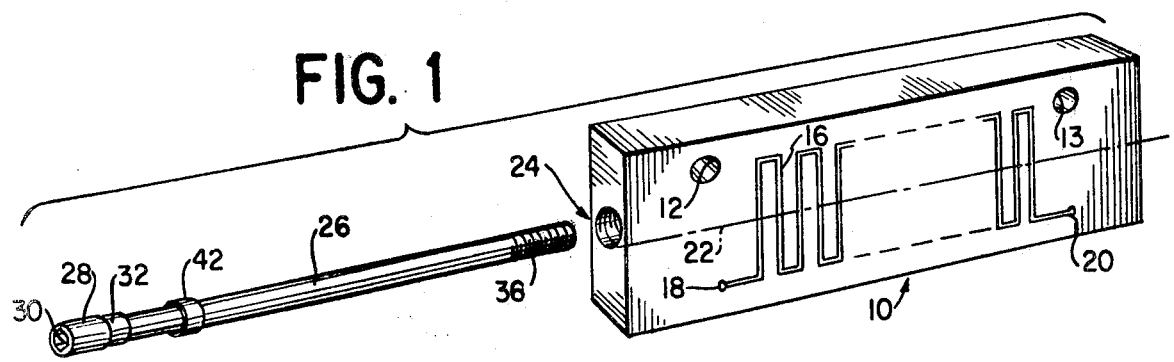
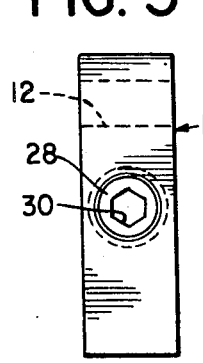
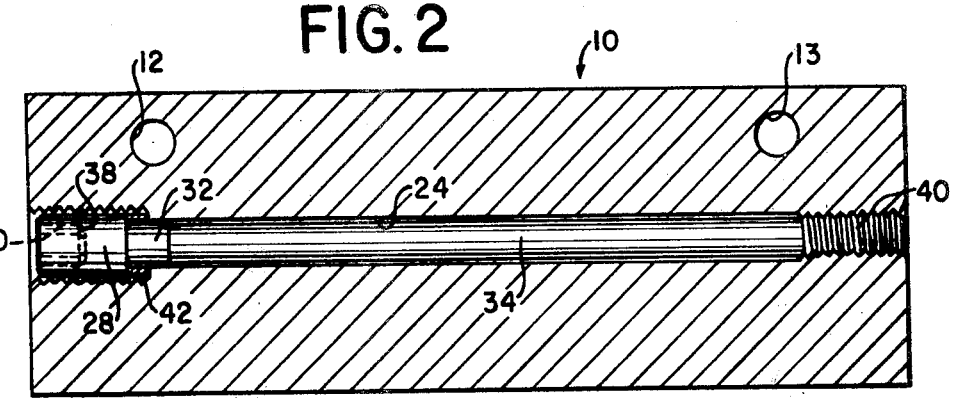
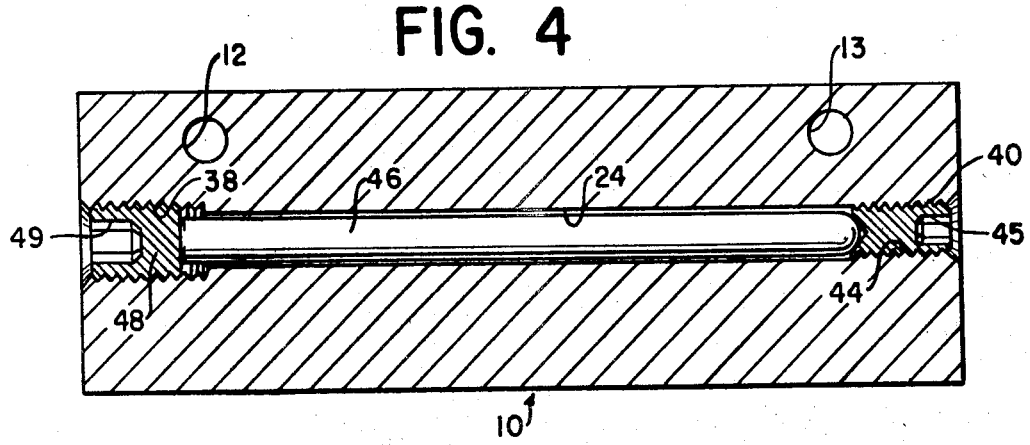

CORRECTION OF LINEAR ERRORS IN POSITION MEASURING TRANSDUCERS

FIELD OF THE INVENTION

The present invention relates to a precision measuring transducer having two relatively movable, electrically coupled members, and in particular, to a member of such a transducer having means for adjusting a dimension of said member to correct for linear errors in one or more electrical patterns affixed to a surface of such member.

BACKGROUND OF THE INVENTION

Precision-measuring transducers having two relatively movable members, each member being spaced from the other and having electrically coupling patterns positioned on the facing surfaces thereof are well known in the art. In their operation, at least one of the patterns on one of the members is electrically energized, and an output signal is detected on at least one of the patterns on the other member to give an indication of the relative position of the two members.

Transducers of this type are manufactured under the trademark INDUCTOSYN® by Farrand Industries, Inc., and the electrical coupling between the circuit patterns on the surface of the members can be of the electromagnetic type as described in U.S. Pat. No. 2,799,835, or of the electrostatic type as described in U.S. Pat. No. 3,961,318. The relative motion between the transducers can be either linear or rotary. The present invention, however, is limited to transducers for the precision measurement of linear dimensions.

The electrically coupling conductive patterns on the surface of the transducer elements, as described in the aforementioned patents, have pluralities of portions with precisely uniform pitch and length. Slight deviations from or variations of pitch or length produce noticeable effects on the accuracy and precision of the transducers involved.

Typically, one of the transducer members, called a "scale" member, can be provided with a rectangular periodic wave pattern of substantially uniform pitch; and the other transducer member, called a "slider" can be provided with two separate rectangular periodic wave patterns ("sine and cosine" windings), the two patterns being arranged in space quadrature, i.e. one of the two patterns is spaced relatively to the other by $N + \lambda/4$ where $N$ is an integer and $\lambda$ is the wavelength of the two periodic slider patterns. In electrical operation of the transducer, the two members, scale and slider, are positioned with an air gap between them, the scale and slider patterns being electrically coupled, so that when the scale pattern is energized by an alternating current voltage, two separate sine and cosine voltages appear across the two slider windings respectively, indicative of the relative linear position of the scale and slider expressed in degrees of a circle, where 360° represents one wavelength of the transducer pattern. Alternatively, the sine and cosine windings of the slider member can be appropriately excited to determine a particular relative position between the scale and slider patterns, and an electrical signal will accordingly be induced across the scale winding, the amplitude of which is indicative of the difference between that determined position and the actual relative position of scale and slider members.

In general, the transducer electrical patterns are made by a photofabrication process. This involves a number of steps including:

(1) making the photographic mask of the pattern on glass;
(2) bonding a conductive metallic sheet on a base material;
(3) sensitizing the conducting sheet with a photoresist material;
(4) exposing the photoresist with the photographic negative;
(5) developing the photoresist; and
(6) etching the metallic sheet material.

Each of these processes can introduce errors, particularly errors of length or of pattern pitch.

It is a function of the present invention to adjust for such variations in pattern length which may be present in these electrical patterns by mechanically varying slightly the dimension of the substrate member on which they are affixed so as to improve the resulting accuracy of the transducer.

SUMMARY OF THE INVENTION

The present invention provides a member of a position-measuring transducer, the transducer having two relatively movable electrically coupled elements, the member comprising a base with an electrical coupling element affixed to one surface thereof, the element having a longitudinal axis. The member further has an aperture therein parallel to that longitudinal axis; and means for insertion in that aperture for changing the length of the base along said longitudinal axis.

The invention further provides for the inclusion of a plurality of electrical coupling element circuits affixed to the surface of the base, these circuits having the same longitudinal axis in common wherein the base has at least one cutout transverse to the axis between those circuits.

BRIEF DESCRIPTION OF THE DRAWING

FIG. 1 is a perspective view of a first specific embodiment of a position-measuring transducer member in accordance with the present invention.

FIG. 2 is a cross-sectional view of the member of FIG. 1 in one mode of operation.

FIG. 3 is a left side view of the member of FIG. 2.

FIG. 4 is a cross-sectional view of the member of FIG. 1 in a second mode of operation.

DESCRIPTION OF TWO SPECIFIC EMBODIMENTS

Figure 5:
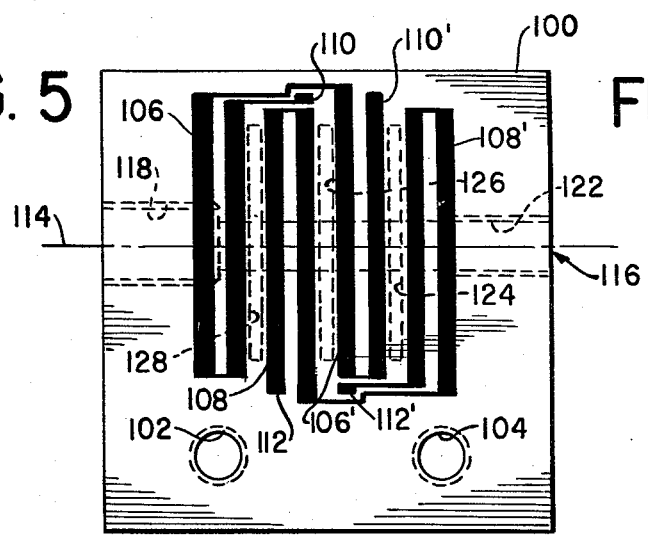
FIG. 5 is a top view of a second specific embodiment of a position-measuring transducer base member in accordance with the present invention.
Figure 6:
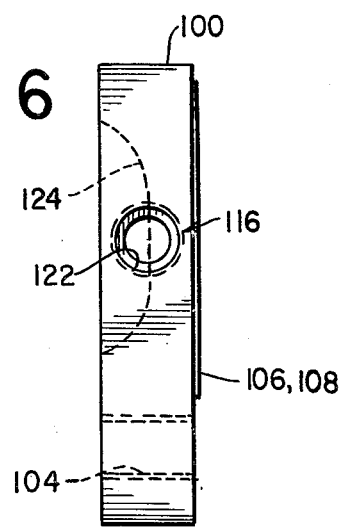
FIG. 6 is a left side view of the transducer base member of FIG. 5.
Figure 7:
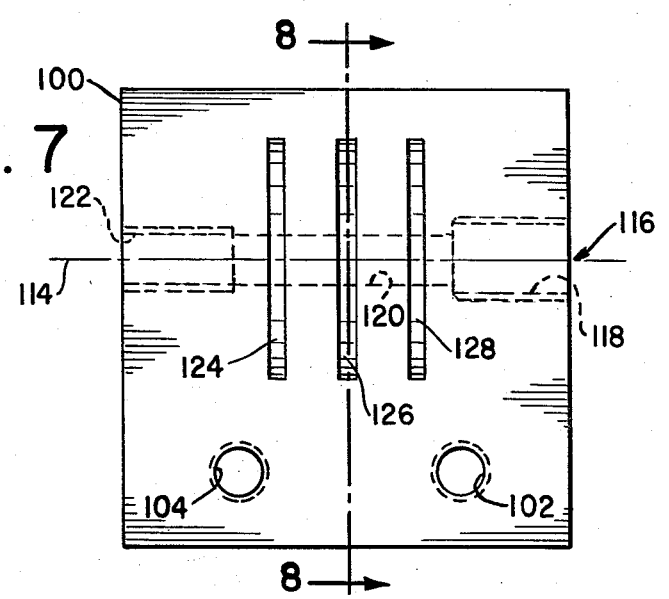
FIG. 7 is a bottom view of the transducer base member shown in FIG. 5.
Figure 8:
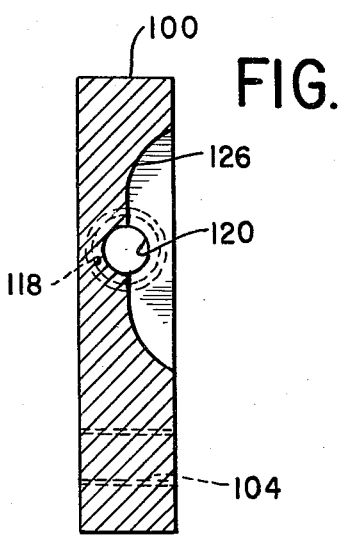
FIG. 8 is a side-sectional view through line 8—8 of FIG. 7.

FIG. 1 shows in perspective a first specific embodiment of the present invention having a scale member of a linear Inductosyn ® transducer in which a steel base block 10 having a length of 3.0 inches (76.2 mm.), width of 1 inch (25.4 mm.) and thickness 0.375 inch (9.4 mm.) has two mounting holes, 12, 13 therethrough, by means of which the block 10 can be mounted to a machine tool bed or other object. A printed circuit conductive scale pattern 16 is affixed to the surface of the block 10 by means of an insulating adhesive layer (not shown). The scale pattern 16 has a repetitive rectangular wave configuration with a cycle of 0.2 inch (5.08 mm.). Terminals 18 and 20 are provided at each end of the pattern to which electrical connections can be made in the actual use of the scale member as a part of a measuring electrical transducer. The scale pattern has a longitudinal axis 22 along the length of the base block 10.

A cylindrical hole 24, having a diameter of 0.166 inch (4.22 mm.) has been drilled through base block 10 parallel to the longitudinal axis 22. The left end 38 of the hole 24 (FIG. 2) has been enlarged to a diameter of 0.213 inch (6.3 mm.) for a depth of 0.375 (9.5 mm.) and tapped to receive a ¼-28 threaded screw. FIGS. 2 and 3 show the hole 24 in more detail. The right end 40 of the hole 24 is also tapped to receive an 8-32 threaded screw.

FIG. 1 also shows a steel, threaded bolt 26 which is used in one mode of operation of the present invention to shorten or compress the length of the block 10, thereby shortening the length of the scale pattern 16 on the surface of the block 10. The bolt 26 has a bolt head 28 of 0.25 inch (6.3 mm.) diameter extending for 0.296 inch (7.4 mm.), a shoulder portion 32 having a diameter of 0.164 inch (4.16 mm.) extending for 0.069 inch (1.8 mm.) and a shank 34 of 0.164 inch (4.16 mm.) diameter. The right end 36 of the bolt 26 has been threaded with an 8-32 thread for 0.375 inch (8.8 mm.) length. A hexagonal socket 30 has been provided in the bolt head 28.

FIG. 2 shows the bolt 26 inserted into the aperture or hole 24 in the block 10 for use in the first, or compression mode of operation of this invention. In this mode, the bolt 34 is threaded into the tapped end 40 by means of an appropriate wrench into the socket 30. A metal thrust washer 42 is advantageously positioned between the bolt head 28 and the innermost end of the enlarged entrance 38 of the hole 24. As the bolt is tightened within the hole 24, it tends to compress the length of the block 10 between the entrance portion 24 and the end portion 40, thereby shortening the length between those positions. The transducer scale pattern 16 on the surface of the block also tends to be compressed in length, thereby shortening to a greater or less extent the nominal 0.2 inch (5.08 mm.) cycle of the pattern.

FIG. 4 shows the present invention in a second mode of operation. Here the fabrication of the block 10 is identical to that described in connection with FIGS. 1-3. However, instead of inserting a threaded bolt 26 into the hole 24, three separate elements are used to place the block in the second, or tension, mode. A threaded end plug 44 is shown threaded into the end portion 40 of the hole 24 by means of an appropriate wrench (not shown) which can be inserted into a hexagonal socket 45 formed in one end of the plug 44. The interior end of the threaded plug 44 is preferably cup-shaped.

A cylindrical rod 46 is next inserted into the hole 24. The right end of the rod 46 is rounded to fit against the cup-shaped end of the plug 44. Finally, a threaded set screw element 48 having a hex socket 49 at one end is threaded by means of a wrench (not shown) into the tapped portion 38 of the hole 24. As the threaded plug 44 and threaded screw element 48 are threaded relatively closer in the hole 24, they bear upon the ends of the rod 46 causing it to go into compression, or even to bow. As the rod 46 is compressed within the hole 24, it tends to lengthen the longitudinal dimension of the block 10, thereby tending to lengthen the nominal space cycle of 0.2 inch (5.08 mm.) of the scale pattern 16 on the surface of block 10.

FIGS. 5-10 show a second specific embodiment of the present invention in which a slider member of an Inductosyn ® transducer can, in a first mode of operation, be adjusted so that the quadrature separation between two electrical patterns on the surface of the slider is shortened; and in a second mode of operation the quadrature distance can be increased.

A steel slider base 100, being 1.5 in. (38.1 mm.) square and 0.31 in. (7.87 mm.) thick is provided with two tapped mounting holes 102, 104 by means of which the slider base 100 can be attached to a movable object such as a machine tool. On the surface of the slider base 100 are affixed two separate conductive slider patterns 106 and 108 by means of an insulating adhesive, not shown. A sine pattern consisting of two rectangular wave sections 106, 106' is interleaved with a cosine pattern having two similar rectangular wave patterns 108, 108'. The bars (shown vertically in FIG. 5) of each of the patterns have the same 0.2 in. (5.08 mm.) cycle, but the sine and cosine patterns 106, 106' and 108, 108', respectively, have a relative displacement of N+λ/4 horizontally from each other to place them in space quadrature, as described above. The sine pattern has end terminals 110 and 110' to which external circuitry can be attached. End terminals 112 and 112' are similarly available for the cosine pattern.

A cylindrical aperture 116 having a longitudinal axis 114 is drilled through the slider base 100 under and transverse to the slider pattern bars. The aperture 116 has an entrance 118 of 0.213 in. (5.31 mm.) diameter and 0.375 in. (9.52 mm.) length tapped for a ¼-28 thread. A central cylindrical portion 120 is 0.166 in. (0.42 mm.) in diameter with a 0.75 in. (19.05 mm.) length. An end portion 122 is also 0.375 in. (9.52 mm.) long and tapped for an 8-32 thread. Three cutout slots 124, 126 and 128 are made on the underside of the slider 100 beneath the slider quadrature patterns. These slots 124, 126 and 128 run transversely to the longitudinal axis 114, and are located at positions between the two quadrature patterns, i.e. cutout slot 124 lies between the first section 106 of the sine pattern and the first section 108 of the cosine pattern. Slot 126 lies between the first section 108 of the cosine pattern and the second section 106' of the sine pattern; cutout slot is located in the space between the second section 106' of the sine pattern and the second section 108' of the cosine pattern. The cutout slots 124, 126 and 128 are 0.0625 in. (1.6 mm.) wide, and as shown in FIGS. 5-8 they have a maximum depth of one-half the thickness of the base 100. The cutout slots could also be made to go completely through the thickness of the base 100 since, as described hereinafter, their purpose is to weaken the structural strength of the base 100 at these particular locations.

Figure 9:
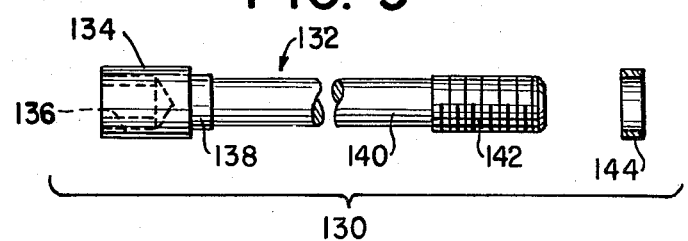
FIG. 9 is an exploded view of means insertable into the aperture of the base member of FIGS. 5–8 for compressing the length of said base member.

FIG. 9 shows a first set 130 of elements insertable in the aperture 116 of the slider base 100 to diminish the quadrature spacing of the quadrature patterns. The first set 130 includes a compression bolt 132 having an unthreaded bolt head 134 which is 0.296 in. (7.52 mm.) in length and 0.212 in. (5.38 mm.) in diameter. A shoulder portion 138 is 0.3 in. (7.62 mm.) long and 0.164 in. (4.16 mm.) in diameter. A compression bolt shank portion 140 is 0.163 in. (4.14. mm.) in diameter. The compression bolt 132 also has a threaded end portion 142 0.375 in. (9.52 mm.) long threaded with an 8-32 thread. Finally, a thrust washer 144 is provided to fit over the end of the compression bolt 132 and onto the shoulder portion 138 against the bolt head 134.

In the first, or compression mode of operation of this second specific embodiment, the compression bolt 132 with thrust washer 144 in place is inserted into the aperture 116 of the slider base 100, and by means of a hexagonal wrench (not shown) mating with the socket 136, the bolt 132 is threaded, and the portion 142 is threaded into the tapped end portion 122 of the aperture 116. As the compression bolt 132 is continued to be tightened, it tends to compress the base block 100 along the axis 114 and since the structural strength of the block 100 has been weakened at the location of the cutout slots 124, 126, 128 (i.e. the location of the separations between the quadrature patterns), it tends to decrease the quadrature spacing between the quadrature patterns 106, 106' and 108, 108'.

Figure 10:
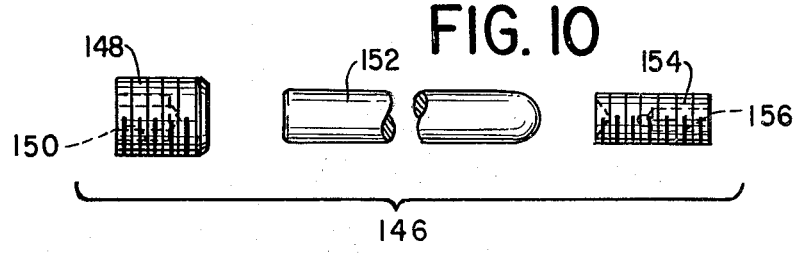
FIG. 10 is an exploded view of means insertable into the aperture of the base member of FIGS. 5–8 for placing the base member in tension.

FIG. 10 shows a second set 146 of elements insertable into the aperture 116 of the base 100 to increase the quadrature spacing between the quadrature patterns. A threaded set screw 148 is 0.312 in. (7.92 mm.) in length 0.25 in. (6.35 mm.) in diameter having a ¼-28 thread. The set screw 148 is fitted with a hexagonal socket 150. A cylindrical compression rod 152 is 0.860 in. (21.8 mm.) long and 0.164 in. (4.16 mm.) in diameter. The rod 152 is advantageously rounded hemi-spherically at one end as shown. Finally, a threaded plug 154 having a length of 0.375 in. (9.52 mm.) and a diameter of 0.164 in. (4.16 mm.) is threaded along its exterior with an 8-32 thread. The plug 154 has a hexagonal socket 156 at one end and a cup-shaped depression at the other, as shown in FIG. 10.

In the second, or tension, mode of operation of this second embodiment of the invention, the rod 152 is inserted (rounded end first) into the aperture 116 of the slider base 100 through the entrance portion 118. The set screw 148 and plug 154 are then threaded (by means of a hexagonal wrench, not shown) into the entrance portion 118 and end portion 122 of the aperture 116, respectively. As the set screw 148 and the plug 154 are threaded closer together they bear against the ends of the rod 152, causing it to go into compression and exert a tensioning force on the slider base 100 along the longitudinal axis 114. This tension force causes the spaces between the quadrature patterns 106,106' and 108, 108' to increase, since the structure of the base 100 has been relatively weakened by the cutout slots 124, 126, 128 at these positions.

It will be seen, therefore, that two specific embodiments of the present invention have been described. In the first embodiment, a position measuring transducer scale member can be tested in conjunction with an electrically coupled, relatively movable slider element to determine its accuracy in the transducer. Depending upon the nature of any error observed, the length or pitch of the scale pattern 16 (see FIGS. 1-4) can be adjusted to be shorter or longer by means of the single threaded bolt 26, or by means of the three elements 44, 46 and 48, to correct or diminish the observed error.

Similarly, in the second disclosed embodiment (see FIGS. 5-10) a transducer slider member having a plurality of electrical slider patterns positioned in space quadrature can be tested in conjunction with an electrically coupled, relatively movable scale element to determine its accuracy in position measurement. Again, depending upon the nature of the error observed, the quadrature spacing between the electrical slider patterns can be adjusted to be smaller or larger by means of the insertable elements 130 and 146, respectively, so as to reduce the observable error of the transducer.

What is claimed is:

1. A member of a position measuring transducer, said member being adapted for use with a transducer having two mutually spaced, relatively movable members with electrically coupled elements, said member comprising:
   a base having a plurality of electrically coupling element circuits affixed to one surface thereof, said circuits being spaced from each other by a predetermined initial spacing distance, said circuits further having a common longitudinal axis; wherein said base has at least one cutout portion transverse to said axis between said circuits;
   said base having an aperture therein parallel to said longitudinal axis; and
   means for insertion in said aperture for changing the spacing distance between said circuits.

* * * * *